W. A. Stack,
Cage Trap,
No. 84,013. Patented Nov. 10, 1868.
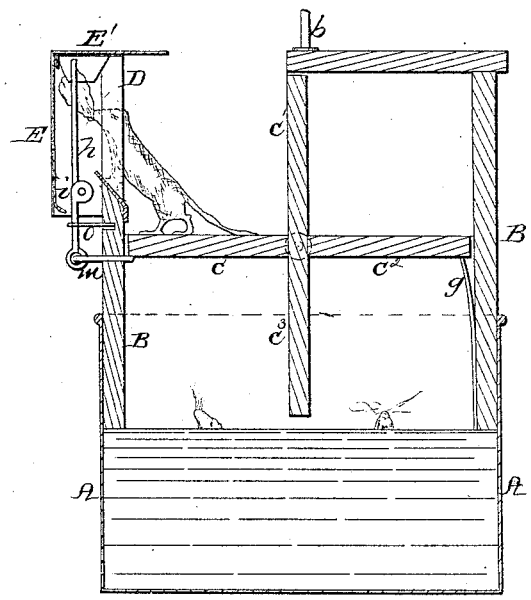
Fig; 1.
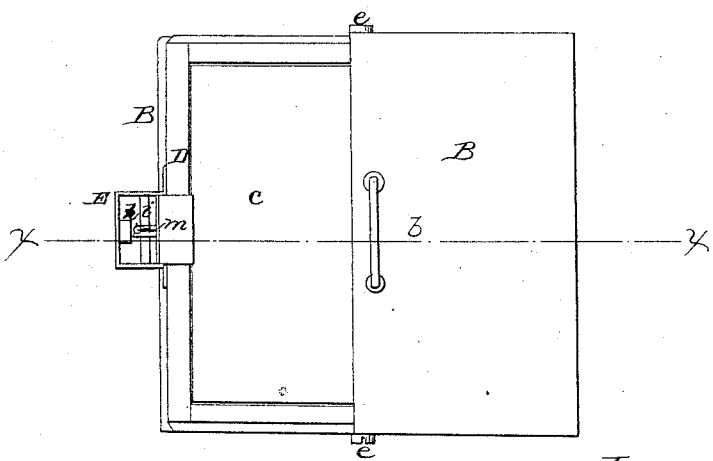
Fig; 2.
Witnesses:
Inventor:
Wm. A. Stack

WILLIAM A. STACK, OF HILLSBOROUGH, MARYLAND.

Letters Patent No. 84,013, dated November 10, 1868.

IMPROVED ANIMAL-TRAP.

The Schedule referred to in these Letters Patent and making part of the same.

*To all whom it may concern:*

Be it known that I, WILLIAM A. STACK, of Hillsborough, in the county of Caroline, and State of Maryland, have invented a new and improved Animal-Trap; and I do hereby declare that the following is a full, clear, and exact description of the construction and operation of the same, reference being had to the accompanying drawings, making a part of this specification, in which—

Figure 1 is a vertical cross-section through the line x x of fig. 2.

Figure 2 is a top view.

This invention relates to the class of self-setting traps, and consists in a new and improved arrangement of the bait-box, with the trap-door and passage-way for the animals, by which they can be enticed more readily to the middle of the trap-door, before it falls and precipitates them into the receptacle below.

In the drawings, A indicates the walls of the receptacle, into which the animals fall when the trap is sprung. These walls are made of or lined with sheet-metal, wire, or other suitable material, which the animal cannot gnaw through, or they may be simply the walls of the barrel, box, or other vessel upon which the trap is set.

Above this receptacle, and resting upon it, is the body of the trap, B, provided with a handle, b, by which it can conveniently be lifted and carried from place to place.

The trap-door consists of four leaves, $c\ c^1\ c^2\ c^3$, united along their adjacent edges, and attached to a shaft, or supported by spindles or journals $e\ e$, so as to form a species of wheel, capable of rotating freely upon the shaft, spindles, or journals.

This wheel is supported in the box B, in the position shown in fig. 1, and when the trap is set, one of its arms or leaves, c, forms the floor of a passage-way, along which the animals move, another, $c^1$, forming the side wall of the passage-way, opposite to the bait-box. The other side wall is formed by a board, D, erected for the purpose.

E is the bait-box, which is made of sheet-metal, and fastened to the outside of the board D, the latter being cut away at that point, so that the animal can easily get at the bait when he arrives at the middle of the floor or trap-door c, but cannot see the bait, or reach it, until he does arrive there.

The bait is attached to a holder, h, of wire, which is pivoted at i, and connected with a stop, m, that arrests the motion of the trap-door, and holds it in position, until the trap is sprung, a spring, o, of rubber, or other suitable material, serving to keep the bait-holder and stop in position.

The bait-box E is provided with a cover, $e'$, which will prevent the animals from getting into it, except from the floor c, and which may, however, be removed readily at any time, for the purpose of supplying or removing the bait. A stop, g, is provided, to prevent any retrograde movement of the wheel C.

The journals $e\ e$ may be made to pass through the wall of the box B, and screw into the revolving trap-door or wheel C, and may be provided with a head or thumb-piece, by which they can, at any time, be unscrewed and removed, and the trap-door thereby be allowed to be taken out.

The operation of this trap is exceedingly simple and effective. It is set in such a position that the passage-way comes in a line with the usual track of the animal, and obliges him to pass through it on the way into or out of his hole. He may be enticed through it, at first, by scattering a few crumbs of food along the floor, c. When he has become so accustomed to passing across it, that he does so without apprehension of danger, I bait the trap, put on the cover $e'$, and leave it to operate. The animal comes on the trap-door, smells the bait, and advances to the middle of the door before being able to find it, when, upon attempting to get possession of it, he forces the stop m from under the floor, and, by his own weight, turns the wheel, and precipitates himself into the receptacle below, while the trap sets itself, and is at once ready for another victim.

Having thus described my invention,

What I claim as new, and desire to secure by Letters Patent, is—

The arrangement of the box B, the rotating wheel, having the trap-door arms $c\ c^1 c^2 c^3$, the stop m, pivoted bait-holder h, spring o, wall D, and metallic bait-box E, when the said parts are constructed and arranged to operate in the manner described.

To the above specification of my invention, I have signed my hand, this 25th day of May, 1868.

WM. A. STACK.

Witnesses:
CHAS. A. PETTIT,
GEO. W. ROTHWELL.